United States Patent [19]

Hill

[11] 4,162,760

[45] Jul. 31, 1979

[54] DISC CENTRIFUGE WITH UNDERFLOW DISCHARGE

[75] Inventor: John H. Hill, Wayne, Pa.

[73] Assignee: Pennwalt Corporation, Philadelphia, Pa.

[21] Appl. No.: 923,135

[22] Filed: Jul. 10, 1978

[51] Int. Cl.² .............................................. B04B 11/02
[52] U.S. Cl. ..................................... 233/19 R; 233/27
[58] Field of Search ................ 233/14 R, 19 R, 20 R, 233/27, 28, 3, 1 R, 4, 1 D, 46, 47 R

[56] References Cited

U.S. PATENT DOCUMENTS

| | | | |
|---|---|---|---|
| 3,204,868 | 9/1965 | Honeychurch | 233/14 R |
| 3,799,431 | 3/1974 | Lavanchy et al. | 233/3 |

FOREIGN PATENT DOCUMENTS 142589 4/1959 U.S.S.R. ................................. 233/14 R

*Primary Examiner*—George H. Krizmanich
*Attorney, Agent, or Firm*—Charles N. Quinn

[57] ABSTRACT

A centrifuge for separating a solids-liquid slurry includes a rotor, rotatable about a vertical axis, with a vertically upstanding central drive shaft, frusto-conical discs vertically spaced one from another about the shaft, a hollow housing connected to the shaft and rotatable unitarily therewith, surrounding the discs and spaced therefrom, with the housing having a frusto-cylindrical central portion with horizontal nozzles for discharge of thickened solids therethrough and having upper and lower frusto-conical skirt portions which taper from the central portion towards the shaft. A stationary casing surrounds the rotor. Space between the casing and the central drive shaft defines a liquid outlet; a thickened solids outlet extends from the lower portion of the casing. A stationary inlet feed tube extends into the housing through a lower portion of the casing. A stationary baffle is interposed between the rotor and the casing, below the level of the discharge nozzles, and is separated from the inlet tube by an annular space defining a thickened solids recycle inlet extending from a sump bounded by the baffle and the lower portion of the casing. The baffle is generously spaced away from the casing interior, so that a recycle solids path defined by the space between the baffle and the casing interior, up to the thickened solids recycle inlet, allows flow of recycle solids therethrough with flow rate and pressure drop being essentially independent of viscosity. The centrifuge includes toroidal means interposable into the annular space for adjustably varying the size of the thickened solids recycle inlet and includes preferably manually adjustable means for maintaining a preselected pressure head within the sump by maintaining a preselected height of thickened recycle solids material between the baffle and the casing, above the sump.

16 Claims, 4 Drawing Figures

DISC CENTRIFUGE WITH UNDERFLOW DISCHARGE

BACKGROUND OF THE INVENTION

1. Field of the Invention

This invention relates to disc-type centrifuges, for separating solids-liquid slurries, which recycle thickened solids through the centrifuge. U.S. Pat. No. 3,799,431 discloses a centrifuge of this type.

2. Description of the Prior Art

In disc-type centrifuges it is often necessary to recycle thickened solids back into the centrifuge. In the absence of sufficient solids in the feed, excess liquid passes through the solids discharge nozzles and may cause equipment downstream of the disc centrifuge to malfunction.

It is known to use valves to adjust thickened solids recycle during centrifuge operation. Typically, a needle valve is used at the bottom of the stationary casing which surrounds the centrifuge rotor, with an additional control valve upstream of the needle valve. Such arrangements are disclosed in U.S. Pat. Nos. 2,616,620; 2,958,461; 3,080,108; and 3,204,868.

Another approach to solids recycle is to provide a rotatable screw within the recycle orifice, to promote active recycle of thickened solids by impelling the recycle solids upwards into the rotor. The screw is partially submerged in a sump at the bottom of the separating chamber. This approach is disclosed in U.S. Pat. No. 2,928,592.

Yet another approach is to utilize an upwardly directed nozzle, at the bottom of the stationary casing, which works in combination with a stationary aspirating ring to urge solids material falling to the bottom of the casing to join solids being directed upwardly into the separating rotor. The aspirating ring is not adjustable. This approach is disclosed in U.S. Pat. No. 2,559,453.

Other patents disclosing centrifuges, which may be of background interest, are U.S. Pat. Nos. 1,492,695 and 3,536,254. Neither of these disclose solids recycle.

To appreciate the problems to be overcome in designing a centrifuge which utilizes solids recycle, the mechanics of fluid flow through a valve must be understood:

Pressure drop across a valve is a function of (1) velocity and (2) viscosity of material flowing therethrough. The valve openable orifice presents a restriction which converts pressure head associated with material entering the valve into velocity head associated with material passing through the valve restriction. The length of the valve openable orifice is quite short. This minimizes the effect viscosity has on pressure drop across the valve since viscosity affects pressure drop, by slowing material flow, to the extent that shear stresses are created in the material as the material contacts the surrounding wall. Thus pressure drop across conventional valves is primarily a function of velocity and hence flow rate of material flowing through the valve; viscosity has a small, yet measurable, effect on pressure drop and changes in viscosity do not greatly effect pressure drop. Correlatively, mass flow rate through a conventional valve is primarily a function of pressure drop across the valve; viscosity and viscosity changes have a small effect on flow rate in conventional valves.

Use of valves, as taught by the prior art, to regulate thickened solids recycle flow, is disadvantageous.

When a valve is positioned in the centrifuge thickened solids discharge line, an increase in viscosity of discharged thickened solids results in a small increase in pressure drop across the valve, which increases pressure in the centrifuge. This increased pressure causes increased recycle of thickened solids within the centrifuge, which causes the concentration and, correspondingly, the viscosity of discharged thickened solids to increase still further; this phenomenon escalates until no thickened solids discharge from the centrifuge or until pressure within the centrifuge becomes high enough to force a slug of thickened solids through the valve. In either event the centrifuge thickened solids discharge varies in both concentration and flow rate; this is not permissible since downstream equipment may be adversely affected. In a similar manner, even small decreases in viscosity of discharged thickened solids can result in impermissible variations in thickened solids discharge concentration and/or flow rate.

When a valve is positioned in the centrifuge thickened solids recycle line, even a small increase in viscosity of discharged thickened solids increases pressure drop along the path from the nozzle discharge to the recycle inlet; this path includes the recycle line and the valve. Since the recycle line is a pipe, most of the increased pressure drop occurs in the pipe with only a minor portion of the increased pressure drop occurring at the valve (due to the aforementioned pressure drop-viscosity characteristic of valves). The increased pressure drop reduces recycle thickened solids flow rate, which reduces concentration and hence viscosity of the thickened solids; a degree of internal control of solids concentration results. However since the entire pipe is viscosity-sensitive, the valve provides only minimal capability to control recycle flow as a function of viscosity. (Indeed, the control provided by the valve is so minimal that some designers dispense with the valve and depend solely on the control afforded by the pipe pressure drop). Furthermore, the viscosity-sensitive character of the recycle solids line severely limits maximum recycle-solids flow rate attainable therethrough; this in turn limits the capability of the centrifuge to produce solids discharge of preselected concentration which does not change with variations in input slurry flow rate and/or solids concentration. In a similar manner, even small decreases in viscosity of discharged thickened solids can result in impermissible variations in thickened solids discharge concentration and/or flow rate.

Another known approach is to provide a viscometer and a pump which operates in response to the viscometer. The viscometer senses viscosity of thickened solids output by the centrifuge and, when the sensed viscosity becomes too low, actuates the pump to divert some of the solids output back into the recycle feed. These arrangements are typically quite costly.

For optimal operation of internal recycle centrifuges of the type of which this invention relates, a recycle solids sump pressure head must be maintained independent of recycle solids viscosity. Restriction orifices, valves, and the like cannot maintain a recycle solids sump pressure head which is independent of recycle solids viscosity since such devices are viscosity-sensitive. (The above-presented discussion of viscosity-pressure drop characteristics of conventional valves is equally applicable to restriction orifices.) Pumps may be used to perform this function but become excessively expensive when coupled with requisite sump pressure measuring and pump control apparatus.

U.S. Pat. No. 3,536,254 discloses an adjustable weir in conjunction with a centrifuge. The weir is used to maintain water level in the centrifuge tank. The weir disclosed in the U.S. Pat. No. 3,536,254 consists of lengths of pipe which are viscosity sensitive, i.e. pressure drop along the pipe changes as viscosity of fluid flowing through the pipe changes. Thus U.S. Pat. No. 3,536,254 weir cannot maintain a constant pressure head when a material of variable viscosity, such as a solids-liquid slurry, flows through the pipes forming the weir. The U.S. Pat. No. 3,536,254 does not disclose a disc-type centrifuge of the kind to which this invention relates; there is no recycle of solids at the bottom of the centrifuge bowl in the apparatus shown in the U.S. Pat. No. 3,536,254. Moreover, the U.S. Pat. No. 3,536,254 does not suggest regulating the pressure head of a viscous slurry to thereby effect recycle of solids through an adjustable orifice in a disc-type centrifuge. The U.S. Pat. No. 3,536,254 controls water level within a stationary bowl to thereby control an oil-water interface level, when oil is being separated from water.

SUMMARY OF THE INVENTION

This invention provides a viscosity-insensitive means for adjustably maintaining a preselected pressure in a recycle solids sump in a disc-type centrifuge, which means is used in conjunction with a viscosity-sensitive means for adjustably self-regulating recycle solids flow in the centrifuge to maintain a selected thickened solids discharge concentration. Once the adjustable pressure head maintaining means is positioned to provide a preselected pressure in the sump and the flow regulating means is positioned to provide a specified thickened solids discharge concentration (for a given type of solids, the solids discharge viscosity defines the solids concentration) the centrifuge recycle flow self-regulates, to maintain the desired solids discharge viscosity and hence the desired thickened solids concentration.

Underlying this invention is recognition that (1) changes in viscosity have a small effect on pressure drop across conventional valves because of the aforementioned characteristic whereby conventional valves have an openable orifice of relatively short length, (2) for an adjustable openable orifice to exhibit substantial changes in pressure drop thereacross as a function of viscosity, the orifice must be long (relative to the cross-sectional area for flow) in the direction of flow and (3) for maintenance of pressure in a sump independent of viscosity of material flowing downward into the sump, the path through which the material flows downwardly into the sump must have a cross-sectional area which is large relative to the length of the path.

In a disc-type centrifuge for separating a solids-liquid slurry, which comprises a rotor, rotatable about a vertical axis with a vertically upstanding central drive shaft, a plurality of parallel frusto-conical discs vertically spaced one from another and secured about said shaft, a hollow housing connected to said shaft, rotatable unitarily therewith and surrounding the discs and spaced apart therefrom, with the housing having a frusto-cylindrical central portion with horizontally directed nozzles for discharge to thickened solids therethrough and having upper and lower frusto-conical skirt portions tapering away from the central portion towards the shaft, with a stationary casing surrounding the rotor and a stationary inlet feed tube extending upward through the casing and into the housing, wherein a stationary baffle is interposed between the rotor and the casing below the level of the discharge nozzles and separated from the inlet tube by an annular space defining a thickened recycle solids inlet extending from a sump bounded by the baffle and the casing lower portion, the invention takes the form of the combination of an adjustable dam separating a recycle solids overflow well from space between the casing and the baffle, a toroidal ring moveable vertically about the feed tube from the sump to within the annular space which defines the recycle solids inlet, and a recycle flow path, defined by the space between the casing and the baffle, which is large and through which flow rate and pressure drop are substantially independent of viscosity. This combination serves to optimally supply recycle solids, at a preselected pressure head, to the housing interior for recycle through the nozzles. The ring is located at the end of the recycle flow path forming a recycle solids inlet and is moveable vertically about the feed tube from the sump to within annular space defining the recycle solids inlet. As the toroidal ring is moved vertically about the feed tube, the size of the recycle solids inlet is changed. Flow rate through the recycle solids inlet is highly sensitive to viscosity.

BRIEF DESCRIPTION OF THE DRAWINGS

FIG. 4 is an elevation view, partly in section and partly broken away, taken at a position ninety degrees (90°) around the centrifuge circumference from the position at which FIG. 2 is taken.

DESCRIPTION OF THE PREFERRED EMBODIMENTS

Figure 1:
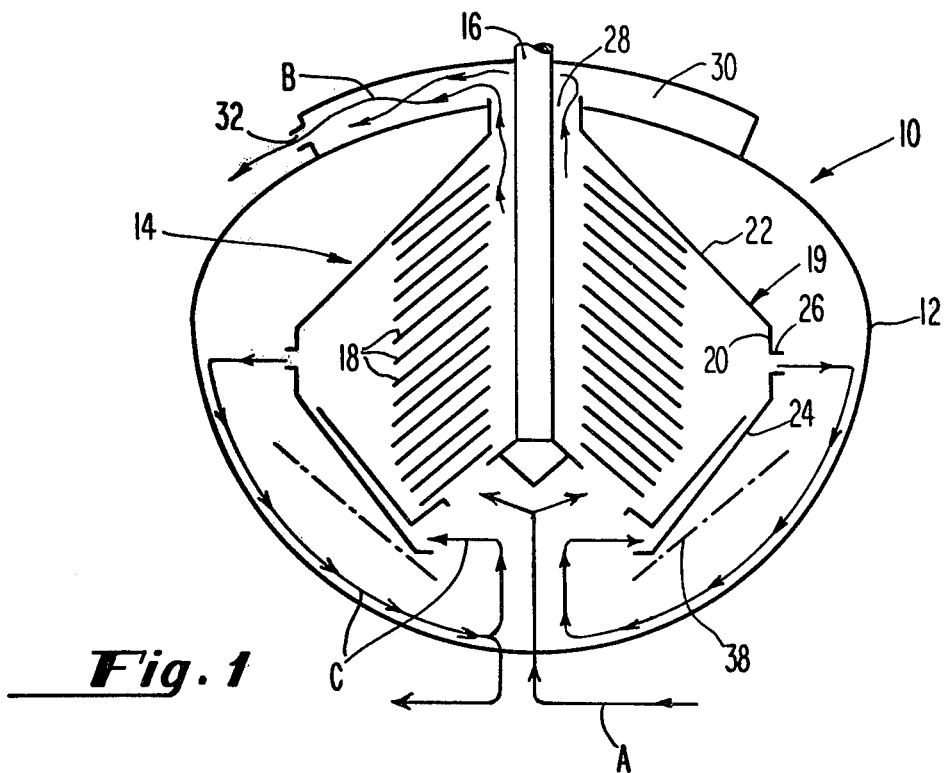
FIG. 1 is a schematic diagram of a centrifuge embodying the invention.

Referring to the drawings, a centrifuge embodying the invention is shown schematically and is designated generally 10 in FIG. 1. Centrifuge 10 includes an outer stationary casing 12 having a rotor 14 therewithin, rotatable about a vertical axis, with the rotor including a vertically upstanding central drive shaft 16, a plurality of parallel frusto-conical discs 18, vertically spaced one from another and secured about the drive shaft, and a hollow housing 19 connected to the shaft via a trunco-conical hub, not shown in FIG. 1, and rotatable unitarily therewith. Housing 19 surrounds discs 18 and is spaced therefrom; housing 19 is made up of a frusto-cylindrical central portion 20, an upper frusto-conical skirt portion 22 tapering convergently from central portion 20 towards drive shaft 16 and a lower frusto-conical skirt portion 24 which tapers convergently downwardly towards the rotor axis of rotation from central portion 20. Disposed about central portion 20 are a plurality of horizontally-directed nozzles 26 through which thickened solids are discharged outwardly, against the interior of casing 12. The upper extremity of skirt portion 22 is spaced from drive shaft 16 to define a clarified liquid discharge 28. A raised portion of casing 12 defines a clarified liquid collection compartment 30 which has a liquid discharge outlet 32 for escape of clarified liquid from the centrifuge. The stationary casing 12 receives thickened solids discharged by the nozzles 26. Drive shaft 16 is connected to and turned by a conventional motor, not shown.

Figure 2:
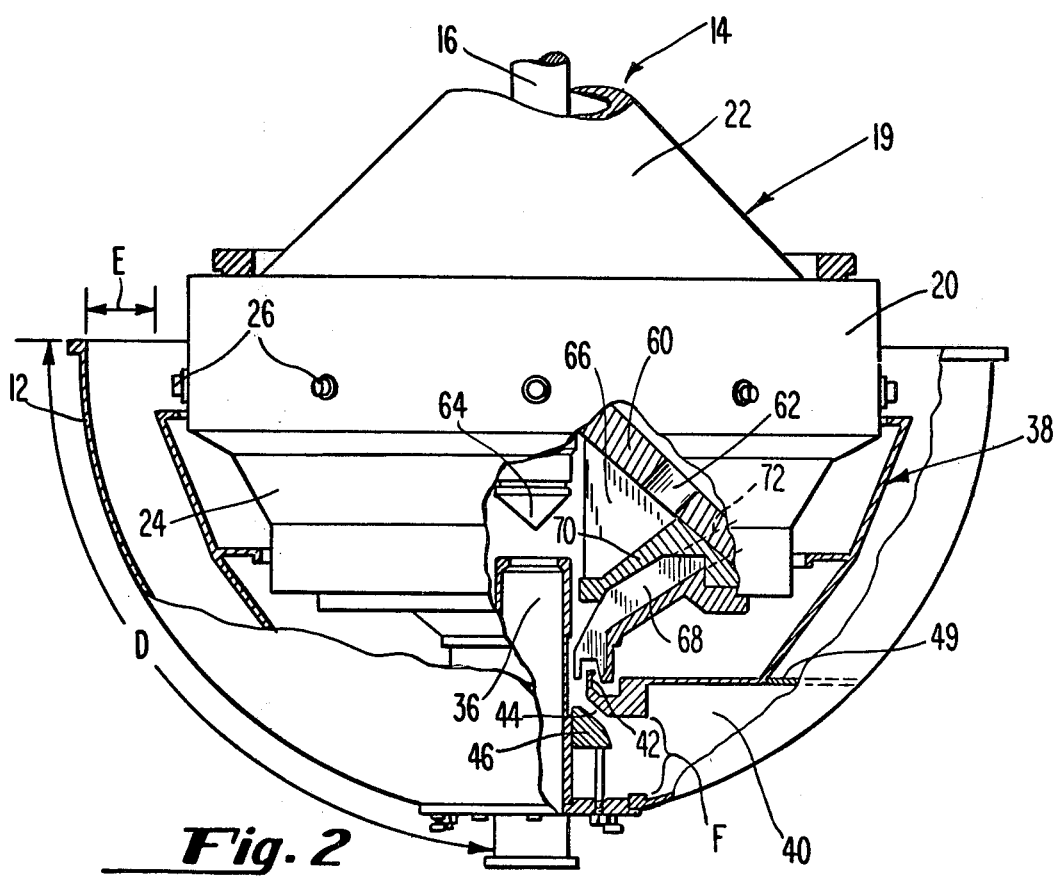
FIG. 2 is an elevation view, partly in section and partly broken away, of a centrifuge embodying the invention.
Figure 3:
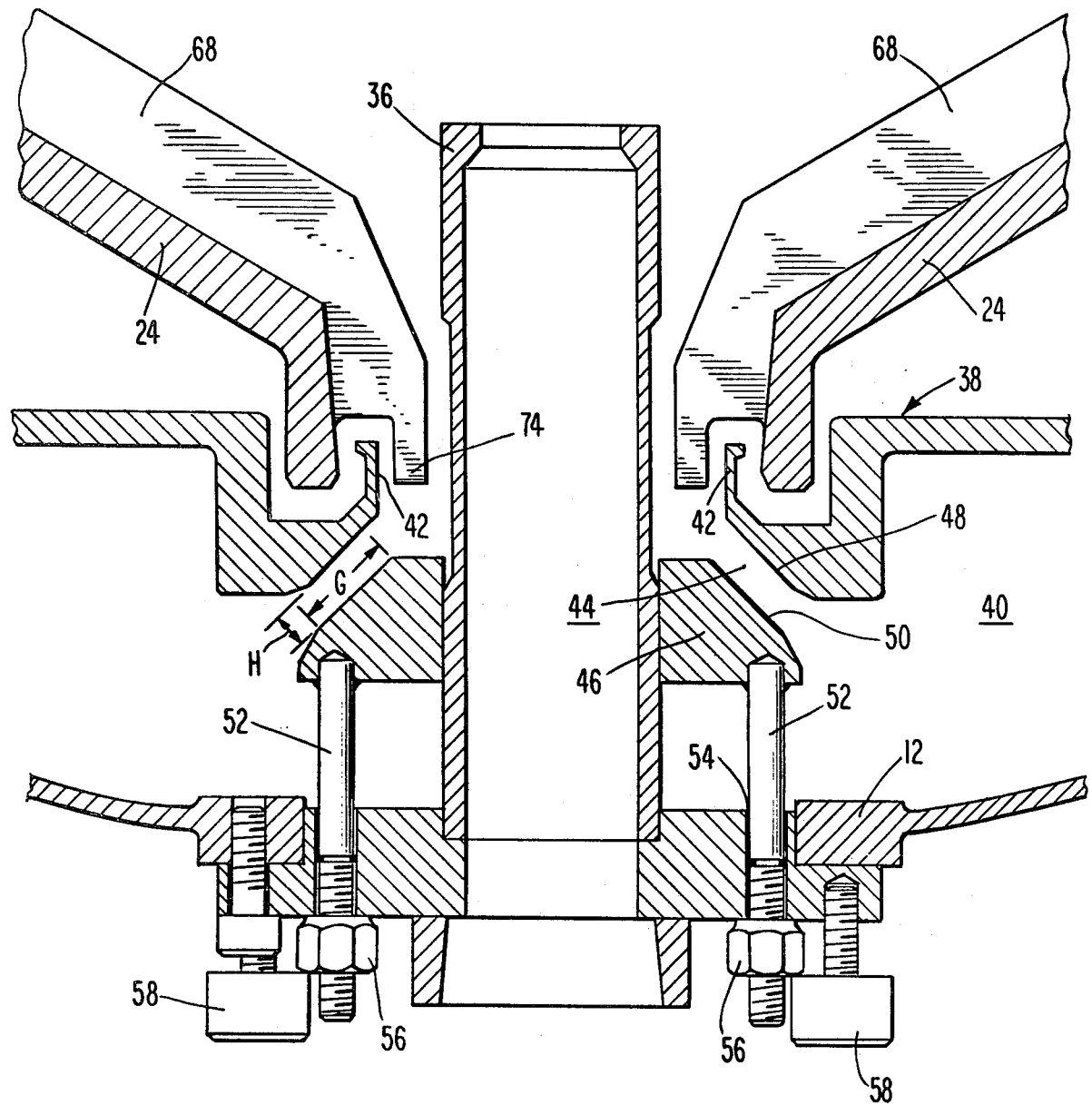
FIG. 3 is an enlarged sectional view of a portion of a centrifuge embodying the invention, taken at the lower portion of FIG. 2.

Referring to FIG. 2, the upper half of casing 12 has been removed to illustrate housing 19, housing central portion 20, housing upper skirt portion 22, housing lower skirt portion 24 and some of nozzles 26. The slurry to be separated is fed upwardly into the interior of housing 19 through an upstanding stationary inlet feed tube 36, which is aligned with the rotor axis of rotation and extends into the interior of housing 19. The portion of housing 19 below nozzles 26 has been broken away in the drawing and is separated from casing 12 by a stationary baffle denoted generally 38 which is secured to casing 12 by a series of circumferentially spaced radially extending spoke-like supports 49. Baffle 38, inlet feed tube 36 and the lower portion of casing 12 define a recycle thickened solids sump 40 of generally toroidal configuration. Baffle 38 to a large degree confines windage developed by the lower portion of rotating housing 19 to the annular region between the baffle and the housing, effectively minimizing turbulence in sump 40. Baffle 38 has an upstanding annular lip 42 proximate feed tube 36, as best seen in FIG. 3, which lip extends parallel to feed tube 36 and is separated therefrom by an annular space 44. Annular space 44 defines a recycle solids inlet for flow of recycle solids from the sump into the interior of housing 20. A toroidal ring 46 concentrically encircles inlet feed tube 36 and is movable vertically therealong, from within sump 40 to a position where a portion of the toroidal ring extends into recycle solids inlet 44, to vary the size of recycle inlet 44.

Baffle 38 has a lower annular surface 48 skew to the cylindrical surface of inlet feed tube 36. Baffle 38 is generously spaced from the interior of casing 12, to define a recycle solids flow path in the area therebetween; the generous spacing allows flow of recycle solids therethrough with flow rate and pressure drop being essentially independent of viscosity. Toroidal ring 46 has an upper annular surface 50 skew to inlet feed tube 36 and complemental to lower surface 48 of baffle 38. The complemental relationship of surfaces 48 and 50 allows closure of the recycle solids orifice, preventing flow of recycle solids from sump 40 back into the interior of housing 20, when toroidal ring 46 is moved vertically upwards, as viewed in FIG. 3, to contact baffle 38.

The configuration of surfaces 48 and 50 results in recycle solids inlet orifice 44 having a wetted length, denoted G in FIG. 3, which is long relative to the cross-sectional area for flow therethrough. This makes the inlet orifice quite viscosity-sensitive. Once inlet orifice size has been fixed by positioning ring 46, the rate of recycle solids flow through the orifice increases as the viscosity of the recycle solids decreases, and vice versa.

Extending downwardly from and secured to toroidal ring 46 is a threaded shaft 52, which passes through casing 12 via sealing passageways 54. Conventional O-rings are provided in passageways 54. A nut 56, threaded on shaft 52, affects vertical movement of toroidal ring 46 upon manual rotation of the nut. A retainer 58, threadably engaging casing 12, contacts the lower surface of nut 56, the retain nut 56 and hence toroidal ring 46 in a selected position. Taken in combination, threaded shaft 52, nut 56 and retainer 58 together comprise means, extending through casing 12, operatively connected to toroidal ring 46, for adjustably moving ring 46 vertically along feed tube 36 within casing 12.

As best seen in FIG. 2, trunco-conical hub 60 connects housing 20 to drive shaft 16. The discs 18, which are not visible in FIG. 2, are connected to shaft 16 above the juncture of shaft 16 and hub 60. Passing through hub 60 are primary feed passageways 62 which provide inlets for slurry feed into the upper interior of housing 20. The bottom of drive shaft 16 is fitted with a downwardly converging conical nut 64 which deflects slurry feed from tube 36 radially outward through passageways 62 and into the upper interior (above hub 60) of housing 20. Extending inwardly from hub 60, below passageways 62, is a frusto-conical feed cone 70 which divides the lower interior (below hub 60) of housing 19 into primary and recycle feed sections. Within the primary feed section of the lower interior of housing 19 is an annular array of spaced radially disposed primary feed accelerating vanes 66, secured to the upper surface of feed cone 70 at positions intermediate primary feed passageways 62. These vanes partition the primary feed stream and guide resulting substreams to primary feed passageways 62. Within the recycle feed section of the lower interior of housing 19 is an annular array of spaced radially disposed recycle feed accelerating vanes 68 secured to the upper interior surface of lower skirt portion 24, intermediate recycle feed passageways 72. These vanes partition the recycle stream and guide resulting substreams to recycle feed passageways 72.

During operation, a feed slurry is supplied to the centrifuge interior through inlet feed tube 36, as denoted by arrows A in FIG. 1. After deflecting off nut 64, passing through passageways 62 and arriving inside the upper interior portion of housing 19, above hub 60, the feed slurry is subjected to centrifugal force within a separating zone between the upper interior portion of housing 19 and drive shaft 16, above hub 60. Centrifugal force, augmented by action of discs 18, promotes clarification of liquid in the slurry feed. Clarified liquid is discharged upwardly through outlet 28 into collection compartment 30, as shown by arrows B in FIG. 1. Thickened solids discharged by nozzles 26 against the interior of stationary casing 12 flow downward, through the recycle solids flow path defined by space between the interior of casing 12 and baffle 38, into the recycle solids sump 40. Some of the thickened solids are recycled back into the interior of housing 20, from recycle sump 40, through recycle solids inlet 44. Flow of thickened solids is shown by arrows C in FIG. 1.

The generous annular spacing of baffle 38 from the interior of casing 12 results in an area for downward flow of recycle solids, between baffle 38 and casing 12, which is large relative to the area for flow of recycle solids through recycle solids inlet orifice 44. The downward flow rate of any particle of sludge, between the vertically extending portions of baffle 38 and casing 12, is relatively slow; during normal operation a substantially static pressure head on recycle solids in recycle sump 40 results from build-up of recycle solids between the vertically extending portions of baffle 38 and casing 12.

Extending downwardly from recycle accelerating vanes 68 are impeller tabs 74, best seen in FIG. 3. When thickened solids in recycle sump 40 build to a level at which they contact impeller tabs 74, rotary motion of the impeller tabs lifts the thickened solids upwardly into the recycle feed section between feed cone 70 and lower skirt portion 24. Once recycle solids are in this section, they are partitioned by the recycle accelerating vanes whereupon the recycle solids flow radially outwardly between the recycle accelerating vanes, through recycle solids passageways 72 and into the separating zone above hub 60, in the hollow upper interior of housing 19. There the recycle solids join solids from the primary feed and are discharged through nozzles 26.

Figure 4:
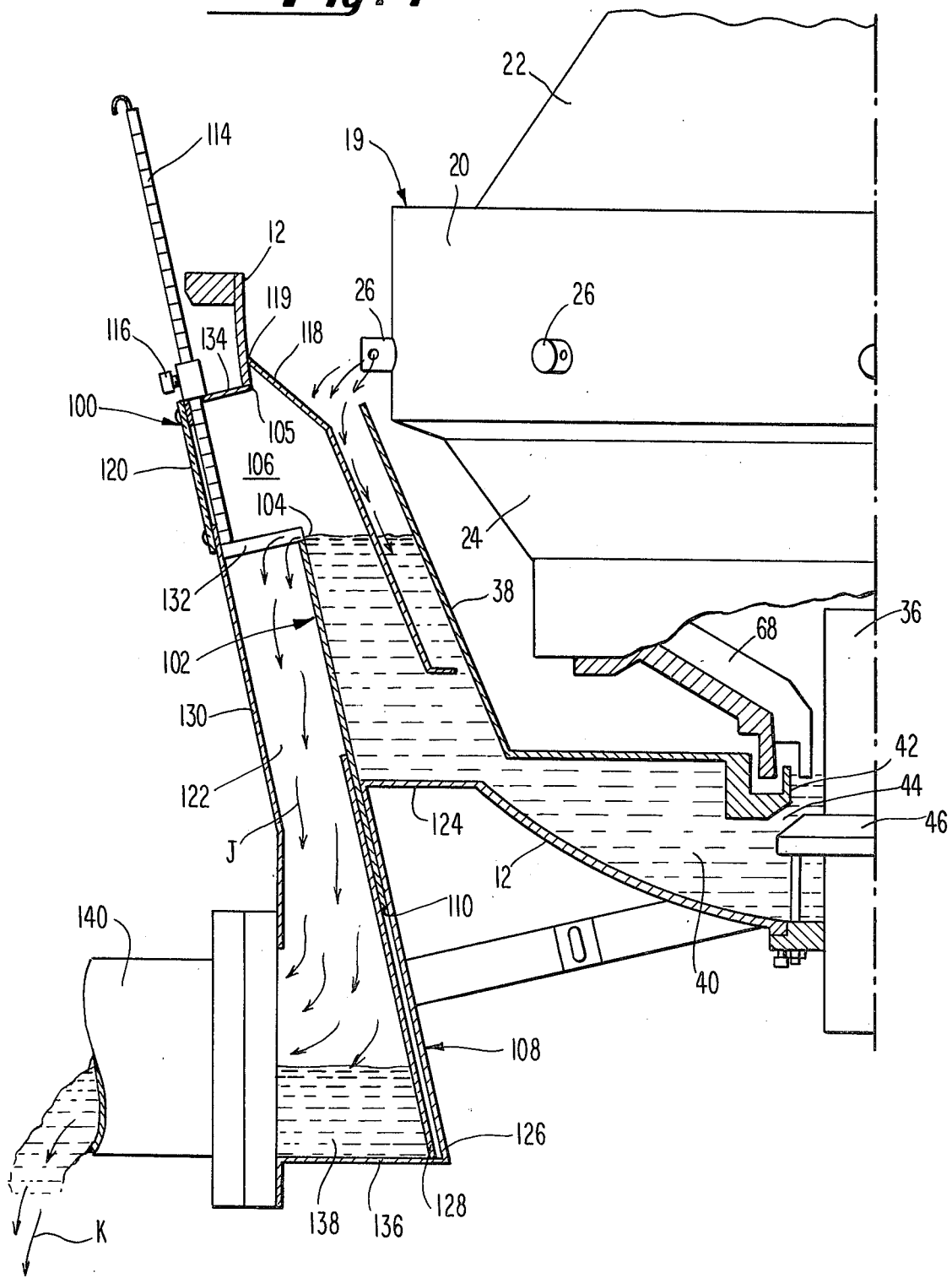

The adjustable means for maintaining a preselected pressure within recycle sump 40, which functions by maintaining a preselected height of thickened solids material between baffle 38 and casing 12, is best illustrated in FIG. 4. The adjustable means generally comprises an overflow well 100 formed in the side of casing 12. Well 100 includes a vertically adjustable dam 102 with a dam upper edge 104 which extends generally horizontally and defines the maximum level of recycle solids between baffle 38 and casing 12. An overflow orifice 106 is defined between dam upper edge 104 and a horizontally extending upper edge 105 of the cutout in casing 12. The well also includes a guide channel 108 which extends downwardly from a lower edge of casing 12, forming a boundary of the cutout. In the embodiment illustrated casing 12 includes a generally horizontally extending plate 124 extending laterally from a curved portion of casing 12 to a juncture with guide channel 108. Channel 108 is preferably comprised of two downwardly extending plates 126 and 128, which are preferably parallel and separated to receive dam lower portion 110. Dam lower portion 110 extends generally downwardly from dam upper edge 104 and serves to laterally support a column of free-standing thickened solids 130 which extends upward from recycle sump 40 between casing 12 and baffle 38. Extending generally upwardly from dam 102 is a dam height gauge 114 having gradations imprinted thereon. Height gauge 114 is received by a thumbscrew fitting 116; dam height may be adjusted by loosening thumbscrew fitting 116, positioning height gauge 114 to a desired position and thereafter retightening thumbscrew fitting 116. Together height gauge 114 and thumbscrew 116 comprise securing means for adjustably maintaining the dam upper edge at a preselected position above recycle solids sump 40.

Extending downwardly and inwardly from casing 12 is an elongated shield 118 which has an upper extremity 119 located just below the level of nozzles 26. Shield 118 extends inwardly from casing 12 towards baffle 38 and reduces the tendency of solids between casing 12 and baffle 38 to circulate around the casing interior as housing 19 rotates. Disposed generally parallel to the path defined by the space between first and second plates 126 and 128 and spaced away therefrom is generally planar plate 130; space between plate 130 and dam 102 defines an overflow discharge path for thickened solids which flow over upper edge 104 of dam 102. Flow of such thickened solids is denoted by arrows J in FIG. 4. Dam 102 is connected, preferably at upper edge 104, to dam height gauge 114 via connecting strips 132 which are spaced to block only a minimal area along dam upper edge 104 from overflow of thickened solids. Extending upwardly from plate 130 is a preferably transparent plate 120, preferably tempered glass, which allows a viewer to inspect height of thickened solids between dam 102 and baffle 38. The upper extremity of outer plate 120 is connected to casing 12 via plate 134. A generally horizontal plate 136 at the lower ends of plates 126 and 128 defines an overflow solids discharge sump 138. As thickened solids collect in overflow sump 138, they are removed therefrom by a discharge pipe 140, as indicated by Arrows K.

For a given slurry and a desired concentration of thickened solids discharge through pipe 140, there exists an optimum position for toroidal ring 46 and a corresponding optimum position for dam 102. These optimum positions fix the size of recycle solids inlet 44 and fix the pressure in recycle sump 40 so just the right amount of thickened solids recycle into the centrifuge, to maintain the desired concentration of thickened solids removed via pipe 140.

Preferably, the optimum position of ring 46 is determined first and then the optimum position of dam 102 is determined.

To determine the optimum position of ring 46, dam 102 is first positioned at a "best guess" initial position for the particular slurry being separated whereupon concentration of thickened solids discharged from centrifuge 10 via tube 140 is monitored and recorded, while a portion of thickened solids is recycled through recycle sump 40 and back into the housing interior through recycle solids inlet 44. (Normally the best guess initial position for dam 102 will be at least halfway up from the lower extreme of possible dam positions. If the dam is positioned too low, pressure within sump 40 will be insufficient to force recycle solids through recycle orifice 44 and no solids will recycle.) The monitored and recorded concentration of thickened solids discharged from the centrifuge is compared to a desired preselected concentration, to see if the monitored and recorded concentration is within a preselected percentage of the preselected concentration. If the monitored and recorded concentration is greater than the preselected concentration by more than the preselected percentage, toroidal ring 46 is moved upwardly, constricting recycle solids inlet 44 and reducing the amount of solids recycled from recycle sump 40 into the housing interior. This results in reduced concentration of recycle solids discharged by nozzles 26 and hence results in reduced concentration of solids in recycle sump 40 and in reduced concentration of solids in overflow sump 138 which are discharged via tube 140. However if the monitored and recorded concentration of thickened solids is less than the preselected concentration by more than the preselected percentage, toroidal ring 46 is moved downwardly, enlarging recycle solids inlet 44; this permits greater recycle flow of thickened solids into the housing interior, increasing the concentration of thickened solids discharged by nozzles 26 thereby increasing concentration of solids in sump 40 and increasing concentration of solids in overflow sump 138 which are discharged via tube 140. These steps may be performed by an operator or by automatic sensing and control apparatus and are typically repeated until the measured concentration of discharged thickened solids is within the preselected percentage of the preselected concentration. Once this is achieved, the "optimum" position of toroidal ring 46 is defined. Retainer nuts 58 are then positioned against nuts 56; this secures torodial ring 46 in position.

To determine the optimum position of dam 102, concentration of thickened solids discharged from centrifuge 10 via tube 140 is again monitored and recorded (this is preferably done just after the "optimum" position of ring 46 has been established) as a portion of thickened solids is recycled through recycle sump 40 and back into the housing interior through recycle solids inlet 44. The monitored and recorded concentration of thickened solids discharged from the centrifuge is compared to a desired preselected concentration. (The measured and recorded concentration is presumably within the preselected percentage of the desired preselected concentration since, presumably, ring 46 has been fixed at its "optimum" position following the procedure described above.) If the monitored and recorded concentration is greater than the preselected concentration, dam 102 is moved downwardly (by appropriately loosening thumb screw assembly 116, moving dam height gauge 114 and retightening assembly 116) which allows more thickened solids to spill over dam 102 resulting in a lower "column" of thickened solids between baffle 38 and casing 12 with a concomitantly lower pressure head on recycle thickened solids in recycle sump 40. The resulting lower pressure in recycle sump 40 forces less recycle thickened solids through orifice 44 and into the interior of housing 19. With less flow of recycle thickened solids into housing 19, thickened solids discharged through nozzles 26 are of lower concentration, resulting in reduced concentration of thickened solids which are in recycle sump 40 and which are discharged via tube 140. Conversely, if the monitored and recorded concentration is greater than the preselected concentration, dam 102 is moved upwardly, preventing thickened solids from spilling thereover until the column of thickened solids between baffle 38 and casing 12 builds to the level of the dam. The resulting higher column of thickened solids produces an increased pressure head on recycle thickened solids in recycle sump 40; the higher pressure in recycle sump 40 forces more recycle thickened solids through orifice 44 and into the interior of housing 19. With greater flow of recycle thickened solids into housing 19, the thickened solids discharged through nozzles 26 are of higher concentration, resulting in higher concentration of thickened solids which are in sump 40 and which are discharged via tube 140. These steps may be performed by an operator or by automatic sensing and control apparatus and are typically repeated until the measured concentration of discharged thickened solids equals the preselected concentration. Once this is achieved, the "optimum" position of dam 102 is defined.

In some instances it may not be possible to obtain a monitored and recorded concentration which is within the preselected percentage of the preselected concentration by adjusting toroidal ring 46; this might be caused by the initial position of dam 102 being too far from the optimum dam position. In such cases, the sequence of adjusting the toroidal ring and then adjusting dam height may be repeated, as needed, until the monitored and recorded concentration equals the preselected concentration.

Thereafter, if solids concentration in the feed increases and/or if feed rate increases, concentration and hence viscosity of thickened solids discharged by nozzles 26 will increase; this produces a concomitant increase in viscosity of thickened solids in the recycle and overflow sumps and hence in viscosity of thickened solids discharged via tube 140. The resulting higher viscosity (relatively thicker) thickened solids in the recycle sump encounter more resistance as they attempt to flow through recycle solids inlet 44; consequently a lesser amount of (the now relatively thicker) thickened solids recycle back into housing 19. With less recycle of thickened solids, solids concentration and hence viscosity of thickened solids, as discharged through nozzles 26, decrease; this leads to decreased concentration and hence decreased viscosity of thickened solids in the recycle and overflow sumps. Lessened recycle of thickened solids persists until concentration and hence viscosity of thickened solids discharged by nozzles 26 into the recycle and overflow sumps and concentration and viscosity of thickened solids discharged from the centrifuge via tube 140 once again equal the preselected concentration and viscosity. (Note however that the postulated initial increase in concentration and hence viscosity of the feed and the postulated initial increase in feed rate do not result in a change in pressure in recycle sump 40 since the height of the "column" of recycle thickened solids, between casing 12 and baffle 38, remains constant due to dam 102.) Conversely, if solids concentration in the feed decreases and/or if feed rate decreases, concentration and hence viscosity of thickened solids discharged by nozzles 26 decrease; this produces a concomitant decrease in viscosity of thickened solids in the recycle and overflow sumps and hence in viscosity of thickened solids discharged via tube 140. The resulting lower viscosity (relatively thinner) thickened solids in the recycle sump encounter less resistance as they attempt to flow through recycle solids inlet 44; consequently a greater amount of (the now relatively thinner) thickened solids recycle back into housing 19. With more recycle of thickened solids, solids concentration and hence viscosity of thickened solids discharged through nozzles 26 increase; this leads to increased concentration and hence increased viscosity of thickened solids in the recycle and overflow sumps. The increased recycle of thickened solids persists until concentration and hence viscosity of thickened solids discharged by nozzles 26 into the recycle and overflow sumps and of thickened solids discharged from the centrifuge via tube 140 once again equal the preselected concentration and viscosity. (Note however that the postulated initial decrease in concentration and hence viscosity of the feed and the postulated initial decrease in feed rate do not result in a change in pressure in recycle sump 40 since the height of the "column" of recycle thickened solids, between casing 12 and baffle 38, remains constant due to dam 102.) Thus, once positions of toroidal ring 46 and dam 102 have been optimally fixed for a given slurry, the centrifuge self-regulates, continuously producing thickened solids of preselected concentration and hence a corresponding preselected viscosity.

The invention can be constructed with the bowl quarter-diameter, denoted D in FIG. 2, being about twenty-six (26) inches. Space between baffle 38 and casing 12 at the upper extremity of baffle 38, just below the level of nozzles 26, can be about two (2) inches, denoted E in FIG. 2. Casing diameter can be about 40 inches. This results in an area for recycle solids downward flow, between baffle 38 and casing 12, at the baffle upper extremity of about two hundred fifty square inches (250 in$^2$). The area for recycle solids flow gradually decreases as the recycle solids flow downward inside casing 12 with the area for recycle solids flow being about sixty square inches (60 in$^2$) at position F in FIG. 2, immediately annularly adjacent to toroidal ring 46. The upper annular skew surface 50 of toroidal ring 46 can have a wetted length of about one and three-eighths inches (1⅜ in), denoted G in FIG. 3.

I claim the following:
1. A centrifuge for separating a solids-liquid slurry, comprising:

(a) a rotor, rotatable about a vertical axis, including:
  (i) a vertically upstanding central drive shaft;
  (ii) a plurality of parallel frusto-conical discs, vertically spaced one from another and secured about said shaft;
  (iii) a hollow housing connected to said shaft and rotatable unitarily therewith, surrounding said discs and spaced apart therefrom, said housing having:
    (1) a frusto-cylindrical central portion, having a plurality of horizontally directed nozzles for discharge of thickened solids therethrough outwardly of said rotor;
    (2) an upper frusto-conical skirt tapering upwardly from said central portion towards said shaft, a portion of said upper skirt proximate said shaft being spaced from said shaft, said space defining a clarified liquid discharge orifice; and
    (3) a lower frusto-conical skirt tapering convergently downwardly from said central portion;
(b) a stationary casing surrounding said rotor, for receiving thickened solids discharged by said nozzles, said drive shaft extending upwardly therethrough, a space between said casing and said shaft at said casing upper extremity defining a liquid outlet;
(c) motor means for turning said rotor by rotating said shaft;
(d) a stationary inlet feed tube extending upwardly through said casing and into said housing, said housing being spaced thereabout;
(e) a stationary baffle interposed between said rotor and a lower portion of said casing below said nozzles, connected to said casing interior, separated from said inlet feed tube by an annular space;
wherein said casing lower portion, said baffle and said inlet feed tube define a recycle thickened solids sump and wherein said annular space between said baffle and said inlet tube defines a recycle thickened solids inlet from said sump into said housing;
(f) a toroidal ring moveable vertically about said feed tube, from within said sump to within said recycle solids inlet, to vary the size of said recycle solids inlet upon ring vertical movement; and
(g) an overflow well, secured to said casing exterior, for holding excess solids material discharged through said nozzles, communicating with said casing interior via an overflow orifice in said casing at a position below the upper extremity of said baffle.

2. The centrifuge of claim 1 wherein said casing further comprises a vertically adjustable dam between said well and said baffle, a dam upper edge defining a vertically moveable boundary of said overflow orifice.

3. The centrifuge of claim 2 further comprising:
(a) a threaded shaft extending downwardly from said toroidal ring through said casing;
(b) a nut in threaded engagement with said shaft, external of said casing; and
(c) retainer means, secured to said casing, slideably contacting said nut at a nut surface remote said casing, urging said nut upwardly against said casing so that upon rotation of said nut, said threaded shaft moves vertically and said toroidal ring moves vertically within said casing.

4. The centrifuge of claim 2 wherein said baffle has an upstanding annular lip extending parallel to said feed tube and separated therefrom by said annular space defining said recycle solids inlet.

5. The centrifuge of claim 4 wherein said baffle has a lower surface skew to said feed tube and wherein said toroidal ring has an upper surface parallel to said skew lower surface of said baffle.

6. The centrifuge of claim 2 or 5 wherein said toroidal ring interior slideably engages said feed tube.

7. The centrifuge of claim 2 further comprising means, extending through said casing and operatively connected with said toroidal ring, for moving said toroidal ring vertically within said casing.

8. The centrifuge of claim 2 or 5 further comprising a guide channel secured to and extending downward from said casing, slideably receiving a lower portion of said dam, for retaining upwardly extending lateral edges of said dam coincident with said casing at a juncture of said casing and said guide channel.

9. The centrifuge of claim 8 further comprising securing means connected to said dam and said casing for adjustably maintaining said dam upper edge at a preselected position above said recycle solids sump.

10. The centrifuge of claim 9 further comprising an elongated shield extending generally inwardly from said casing interior, adjacent said overflow orifice, towards said baffle, an upper extremity thereof located proximate the level of said nozzles, to reduce the tendency of solids between said casing and said baffle to circulate around said casing interior as said rotor rotates.

11. In a centrifuge for separating a solids-liquid slurry including:
(a) a rotor, rotatable about a vertical axis, including:
  (i) a vertically upstanding drive shaft;
  (ii) a plurality of parallel frusto-conical discs vertically spaced one from another and secured about said shaft;
  (iii) a hollow housing connected to said shaft and rotatable unitarily therewith, surrounding said discs and spaced apart therefrom, said housing having:
    (1) a frusto-cylindrical central portion having a plurality of horizontally directed nozzles, for discharge of thickened solids therethrough outwardly of said rotor;
    (2) an upper frusto-conical skirt tapering upwardly from said central portion towards said shaft, a portion of said upper skirt proximate said shaft being spaced from said shaft, said space defining a clarified liquid discharge orifice; and
    (3) a lower frusto-conical skirt tapering convergently downwardly from said central portion;
(b) a stationary casing surrounding said rotor for receiving thickened solids discharged by said nozzles, said drive shaft extending upwardly therethrough, a space between said casing and said central drive shaft proximate said casing upper extremity defining a liquid outlet;
(c) motor means for turning said rotor by rotating said shaft;
(d) a stationary inlet feed tube extending upwardly through said casing and into said housing, said housing being spaced thereabout;
(e) a stationary baffle interposed between said rotor and a lower portion of said casing below said nozzles, connected to said casing interior, separated from said inlet feed tube by an annular space;

wherein said casing lower portion, said baffle and said inlet feed tube define a thickened recycle solids sump and wherein said annular space between said baffle and said inlet tube defines a recycle solids inlet from said sump into said housing; that improvement comprising:
(f) means, connected to said casing, interposable into said annular space between said feed tube and said baffle, for adjustably varying the size of said annular space; and
(g) adjustable means for maintaining a preselected pressure within said sump by maintaining a preselected height of thickened solids material between said baffle and said casing.

12. The centrifuge of claim 2 or 11 wherein said baffle is annularly separated from said casing interior and connected thereto by circumferentially spaced radially extending supports and wherein area for recycle solids flow in said annular space separating said baffle from said casing is large relative to area for recycle solids flow through said recycle solids inlet.

13. A method for operating a self-regulating disc-type centrifuge separating a solids-liquid slurry, to produce a thickened solids output of preselected concentration which once attained is thereafter automatically maintained, said centrifuge having a hollow housing rotatable about a vertical axis inside a stationary casing, said housing having nozzles for discharge of thickened solids therethrough as said housing rotates, with a clarified liquid discharge at said housing upper extremity and a thickened solids recycle sump in said casing below said housing, with a solids inlet feed tube extending through said recycle sump and into said hollow housing, comprising the steps of:
(a) rotating said housing about said axis;
(b) introducing said slurry into said rotating housing through said feed tube;
(c) monitoring and recording concentration of thickened solids discharged from said centrifuge;
(d) recycling a portion of thickened solids discharged by said nozzles, through said recycle sump and back into said housing through an adjustable orifice by which said recycle sump communicates with said housing interior;
(e) constricting said orifice thereby reducing the amount of solids recycled from said sump into said housing interior if said monitored and recorded concentration is greater than said preselected concentration by a preselected percentage but enlarging said orifice thereby increasing the amount of thickened solids recycled from said recycle sump into said housing interior if said monitored and recorded concentration is less than said preselected concentration by said preselected percentage;
(f) repeating the steps of monitoring, recycling and constricting/enlarging until said recorded concentration is within said preselected percentage of said preselected concentration;
(g) locking said adjustable orifice in the position at which said recorded concentration is within said preselected percentage of said preselected concentration;
(h) lowering an adjustable dam portion of said casing to below the level of thickened solids communicating with said recycle sump thereby allowing thickened solids to spill over said dam and exit said sump thereby reducing recycle sump pressure which forces thickened solids through said orifice, if said recorded concentration is greater than said preselected concentration, but raising said adjustable dam to above the level of thickened solids communicating with said recycle sump thereby forcing the level of thickened solids to rise in said recycle sump thereby increasing recycle sump pressure which forces thickened solids through said orifice, if said recorded concentration is less than said preselected concentration;
(i) repeating the steps of recording, recycling and raising/lowering until said recorded concentration equals said preselected concentration; and
(j) locking said adjustable dam in the position at which said recorded concentration equals said preselected concentration.

14. The method of claim 13 wherein said feed tube extends into said orifice and wherein constricting is performed by moving a toroidal ring, surrounding and slideably engaging said feed tube, upwardly along said feed tube into said orifice and enlarging is performed by moving said toroidal ring downward along said feed tube out of said orifice.

15. The method of claim 13 or 14 wherein said orifice is defined by an annular gap separating said feed tube from a stationary baffle forming the upper boundary of said recycle sump.

16. A method for operating a disc-type centrifuge separating a solids-liquid slurry, to produce a thickened solids output of preselected concentration, comprising the steps of:
(a) rotating a hollow housing portion of said centrifuge about a vertical axis;
(b) introducing said slurry into said housing interior through a feed tube extending into said housing;
(c) monitoring and recording concentration of thickened solids discharged from said centrifuge;
(d) recycling a portion of thickened solids, discharged through nozzle portions of said housing into a recycle sump, back into said housing interior through an adjustable orifice by which said recycle sump communicates with said housing interior;
(e) constricting said orifice if said monitored and recorded concentration is greater than said preselected concentration, until said monitored and recorded concentration is within a preselected percentage of said preselected concentration but enlarging said orifice if said monitored and recorded concentration is less than said preselected concentration until said monitored and recorded concentration is within said preselected percentage of said preselected concentration, and thereupon locking said orifice in the position at which said monitored and recorded concentration is within said preselected percentage of said preselected concentration; and
(f) applying increased pressure to thickened solids in said recycle sump, thereby increasing thickened solids flow through said orifice into said housing interior if said monitored and recorded concentration is greater than preselected concentration, but applying decreased pressure to thickened solids in said recycle sump thereby decreasing thickened solids flow through said orifice into said housing interior if said monitored and recorded concentration is less than preselected concentration, until said monitored and recorded concentration equals said preselected concentration.

* * * * *